(12) United States Patent
Lohrentz et al.

(10) Patent No.: US 8,720,171 B2
(45) Date of Patent: May 13, 2014

(54) HELICAL ACTING SNAP ROLL FLUTES FOR CORN HEADER

(75) Inventors: Randy Lohrentz, Buhler, KS (US); Robert A. Matousek, Milan, IL (US)

(73) Assignee: AGCO Corporation, Duluth, GA (US)

( * ) Notice: Subject to any disclaimer, the term of this patent is extended or adjusted under 35 U.S.C. 154(b) by 82 days.

(21) Appl. No.: 13/213,044

(22) Filed: Aug. 18, 2011

(65) Prior Publication Data

US 2012/0042621 A1  Feb. 23, 2012

Related U.S. Application Data

(60) Provisional application No. 61/375,196, filed on Aug. 19, 2010, provisional application No. 61/425,804, filed on Dec. 22, 2010, provisional application No. 61/425,836, filed on Dec. 22, 2010, provisional application No. 61/425,887, filed on Dec. 22, 2010, provisional application No. 61/425,907, filed on Dec. 22, 2010, provisional application No. 61/425,920, filed on Dec. 22, 2010, provisional application No. 61/425,935, filed on Dec. 22, 2010, provisional application No. 61/426,072, filed on Dec. 22, 2010, provisional application No. 61/426,119, filed on Dec. 22, 2010, provisional application No. 61/426,141, filed on Dec. 22, 2010, provisional application No. 61/426,167, filed on Dec. 22, 2010, provisional application No. 61/426,193, filed on Dec. 22, 2010, provisional application No. 61/426,213, filed on Dec. 22, 2010, provisional application No. 61/426,234, filed on Dec. 22, 2010, provisional application No. 61/426,263, filed on Dec. 22, 2010, provisional application No. 61/426,277, filed on Dec. 22, 2010, provisional application No. 61/426,300, filed on Dec. 22, 2010, provisional application No. 61/426,090, filed on Dec. 22, 2010.

(51) Int. Cl.
*A01D 45/02* (2006.01)

(52) U.S. Cl.
USPC .......................................................... 56/109

(58) Field of Classification Search
USPC ............... 56/104, 109; 460/26, 29, 31–33, 35
See application file for complete search history.

(56) References Cited

U.S. PATENT DOCUMENTS 3,707,833 A * 1/1973 Sutton ............................ 56/104
5,451,184 A * 9/1995 Mietzel ........................... 460/32

FOREIGN PATENT DOCUMENTS

DE          19811156 A1    9/1999
EP           0369440 A1    5/1990
WO      WO-01/08465 A1    2/2001

OTHER PUBLICATIONS

International Search Report for International Application No. PCT/US2011/048337 dated Dec. 22, 2011.

*Primary Examiner* — Thomas B Will
*Assistant Examiner* — Mai Nguyen

(57) ABSTRACT

A helical-acting snap roll for a harvesting header having straight flutes which are free of a formed twist. The snap roll includes a plurality of elongated straight flutes that extend substantially the entire length of the snap roll but that are parallel misaligned with a central axis of rotation of the snap roll. A pair of opposing and counter-rotating snap rolls of the present invention chops and pulls crop stalks passing therebetween downward toward the ground while also creating a helical action such that the crop stalks are conveyed rearward. In one embodiment, at least a pair of straight portions acting as flutes are partially parallel aligned with one another along the length and one side of each snap roll.

10 Claims, 11 Drawing Sheets

HELICAL ACTING SNAP ROLL FLUTES FOR CORN HEADER

CROSS REFERENCE TO RELATED APPLICATIONS

The present application claims the benefit of co-pending U.S. provisional application entitled "CORN HEADER (P0921)", having Ser. No. 61/375,196, filed Aug. 19, 2010; of co-pending U.S. provisional application entitled "TILTING CROP STALK CHOPPER (P1177H)", having Ser. No. 61/426,090, filed Dec. 22, 2010; of co-pending U.S. provisional application entitled "PIVOTING GATHERING AUGER FOR CORN HEADER (P1171H)", having Ser. No. 61/425,836, filed Dec. 22, 2010; of co-pending U.S. provisional application entitled "CROP CAPTURING MEMBER FOR CORN HEADER WITH GATHERING AUGER (P1172H)", having Ser. No. 61/425,887, filed Dec. 22, 2010; of co-pending U.S. provisional application entitled "GATHERING AUGER WITH INDEPENDENT SPEED (P1173H)", having Ser. No. 61/425,907, filed Dec. 22, 2010; of co-pending U.S. provisional application entitled "COMBINATION DRIVEN AND IDLER SNAP ROLLS FOR CORN HEADER (P1174H)", having Ser. No. 61/425,920, filed Dec. 22, 2010; of co-pending U.S. provisional application entitled "SPRING LOADED SNAP ROLL FOR CORN HEADER (P1175H)", having Ser. No. 61/425,935, filed Dec. 22, 2010; of co-pending U.S. provisional application entitled "HELICAL ACTING SNAP ROLL FLUTES FOR CORN HEADER (P1176H)", having Ser. No. 61/426,072, filed Dec. 22, 2010; of co-pending U.S. provisional application entitled "REMOVABLE CORN HEADER SNOUT (P1178H)", having Ser. No. 61/426,119, filed Dec. 22, 2010; of co-pending U.S. provisional application entitled "OFFSET SNAP ROLLS FOR CORN HEADER (P1179H)", having Ser. No. 61/426,141, filed Dec. 22, 2010; of co-pending U.S. provisional application entitled "DUAL IDLER ROLLS FOR CORN HEADER (P1180H)", having Ser. No. 61/426,167, filed Dec. 22, 2010; of co-pending U.S. provisional application entitled "SNAP ROLLS WITH HELICAL FLUTES FOR CORN HEADER (P1181H)", having Ser. No. 61/426,193, filed Dec. 22, 2010; of co-pending U.S. provisional application entitled "SMOOTH IDLER ROLL FOR CORN HEADER (P1182H)", having Ser. No. 61/426,213, filed Dec. 22, 2010; of co-pending U.S. provisional application entitled "OFFSET STRIPPER PLATES FOR CORN HEADER (P1183H)", having Ser. No. 61/426,234, filed Dec. 22, 2010; of co-pending U.S. provisional application entitled "METHOD FOR URGING CROP STALKS INTO A GATHERING AUGER FOR A CORN HEADER (P1184H)", having Ser. No. 61/426,263, filed Dec. 22, 2010; of co-pending U.S. provisional application entitled "HELICAL ACTING STRAIGHT SNAP ROLL FLUTES FOR CORN HEADER (P1185H)", having Ser. No. 61/426,277, filed Dec. 22, 2010; of co-pending U.S. provisional application entitled "TWISTED STALK CHOPPING FLUTES FOR CORN HEADER (P1190H)", having Ser. No. 61/426,300, filed Dec. 22, 2010; of co-pending U.S. provisional application entitled "CANTILEVERED GATHERING AUGER FOR CORN HEADER (P1193H)", having Ser. No. 61/425,804, filed Dec. 22, 2010; which are all incorporated herein by reference in their entirety.

TECHNICAL FIELD

This invention relates to cutting and gathering stalk crops such as corn with a header coupled to an agricultural vehicle.

BACKGROUND

Agricultural harvesters such as combines are typically equipped with a harvesting header. Corn headers are specifically designed to pick corn and vary in size from two-row units to twelve-row units or more. As the harvester moves through the field, each row-unit passes between rows of corn. Corn header row units typically use gathering chains to covey crop material and ears rearward toward a cross auger. A set of driven snap rolls, which rotate based on the speed of the harvester, grabs the corn stalks and forces them downward between stripper plates. The ears of corn are snapped free of the stalk and the cross auger passes the ears to the feeder housing of the harvester. If the snap rolls are operated too fast or too slow, ears of corn may be lost or entire corn stalks may be passed to the cross auger and feeder housing.

Known row units require two gathering chains and two tensioners which are heavy, expensive and wear out easily. Furthermore, the gathering chains create a complicated drive mechanism because the axes of the drive sprockets driving the chains are at right angles to the axes of the snap rolls. Also, the gathering chains do not effectively convey a large mass of crop in conditions when material other than ears of corn, such as stalks and leaves, are severed from the ground. What is needed is a simpler and more cost effective row unit that is capable of conveying a large mass of crop.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Figure 1:
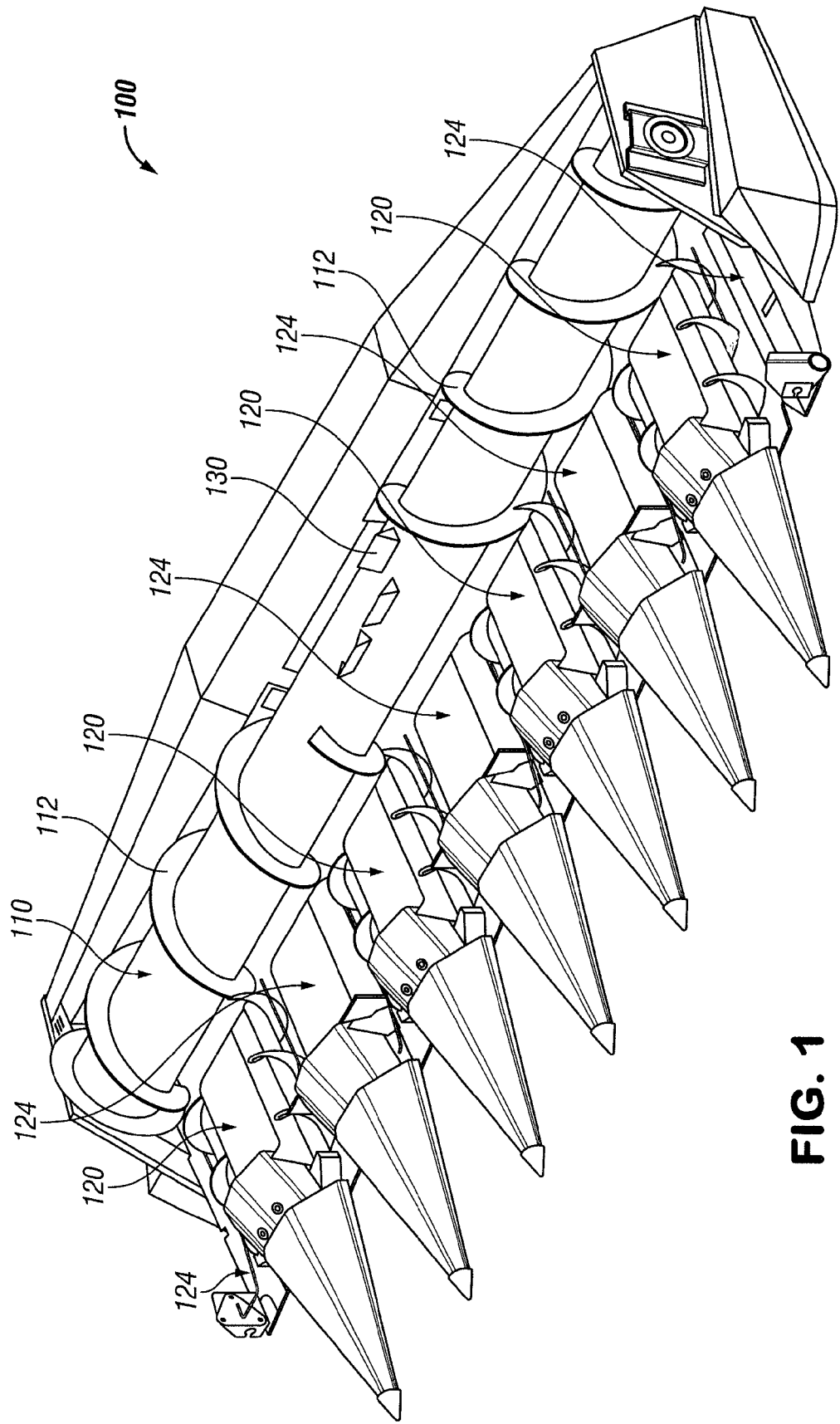
FIG. 1 shows a perspective view of a corn header having a plurality of row units for an agricultural vehicle.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "left" and "right", are made as viewed from the front looking rearward.

The exemplary header 100 selected for illustration in FIGS. 1-5 has a cross auger 110 with spiral flighting 112 for sweeping the ears of corn toward the center of the header 100.

Large cross augers 110 may also have paddles 130, fingers 132 or some other means to facilitate the delivery of the crop rearward to the feeder housing of a harvester. The header 110 has a plurality of forward-extending live row-units 120 and a plurality of forward-extending dead row units 124. The row units 120, 124 and the cross auger 110 define a feeder plane therebetween where useable parts of stalk crops are conveyed rearward from the row units 120, 124 to the cross auger 110.

Figure 2:
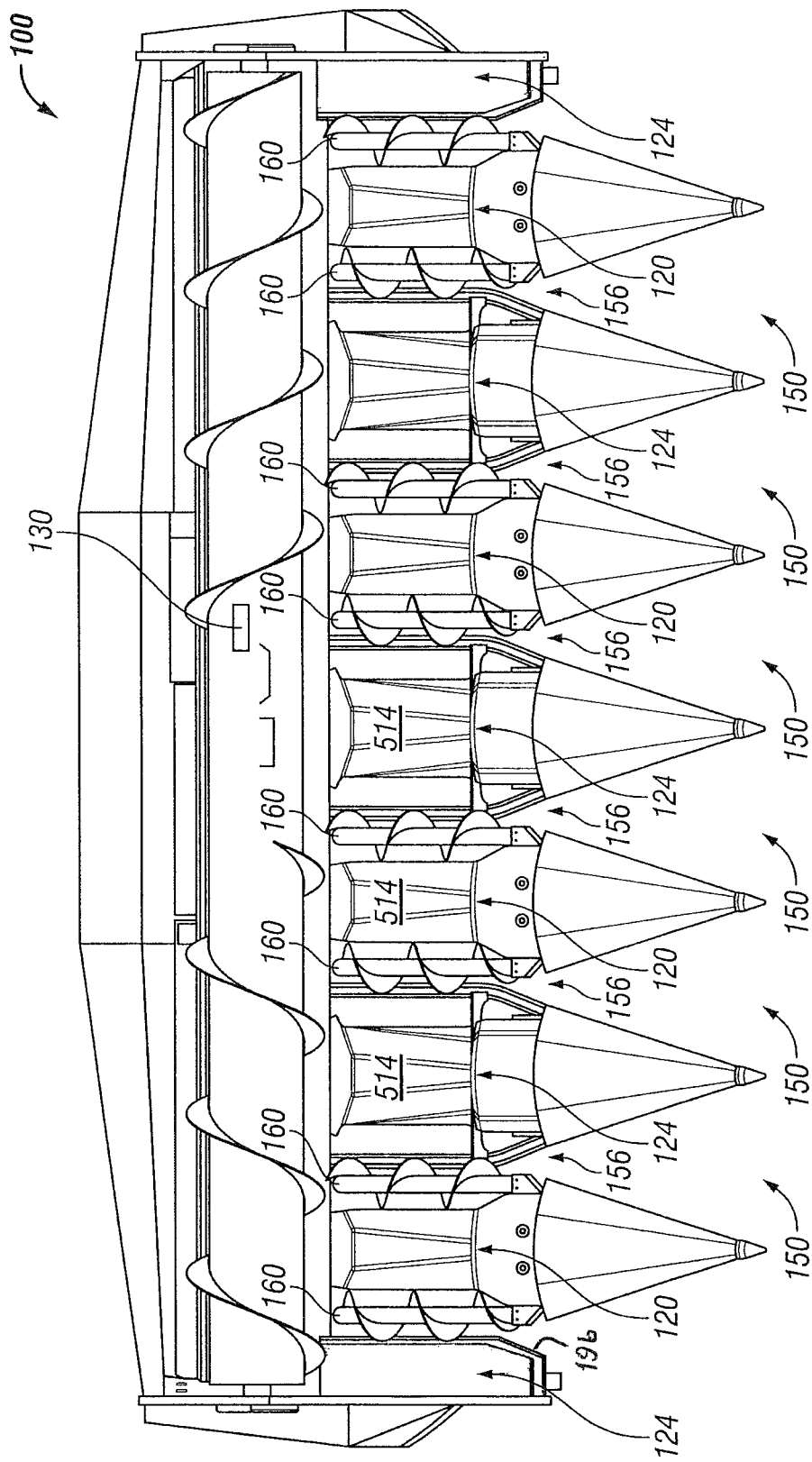
FIG. 2 shows a top view of the header of FIG. 1.
Figure 3:
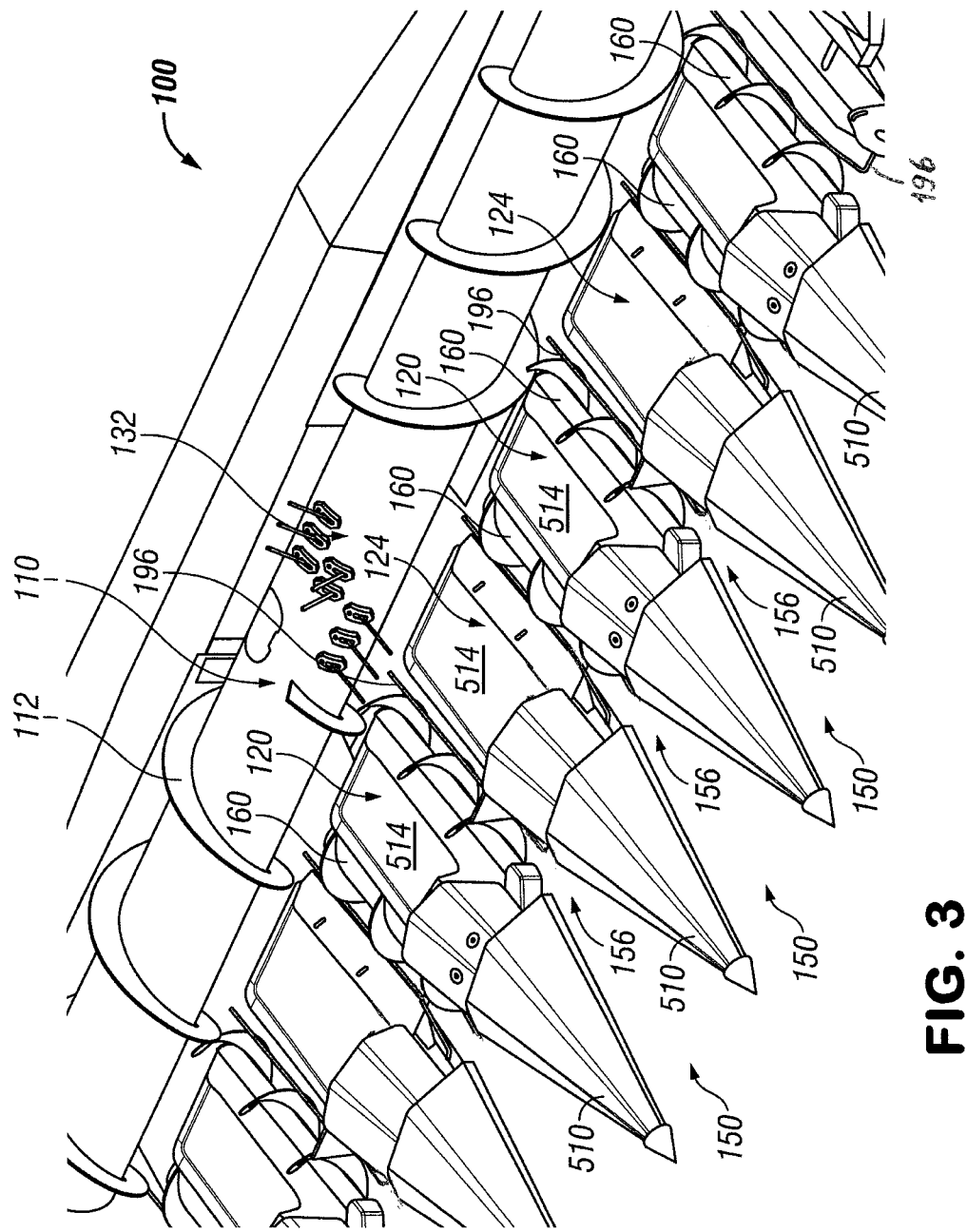
FIG. 3 shows a close-up view of a portion of the header of FIG. 1.
Figure 4:
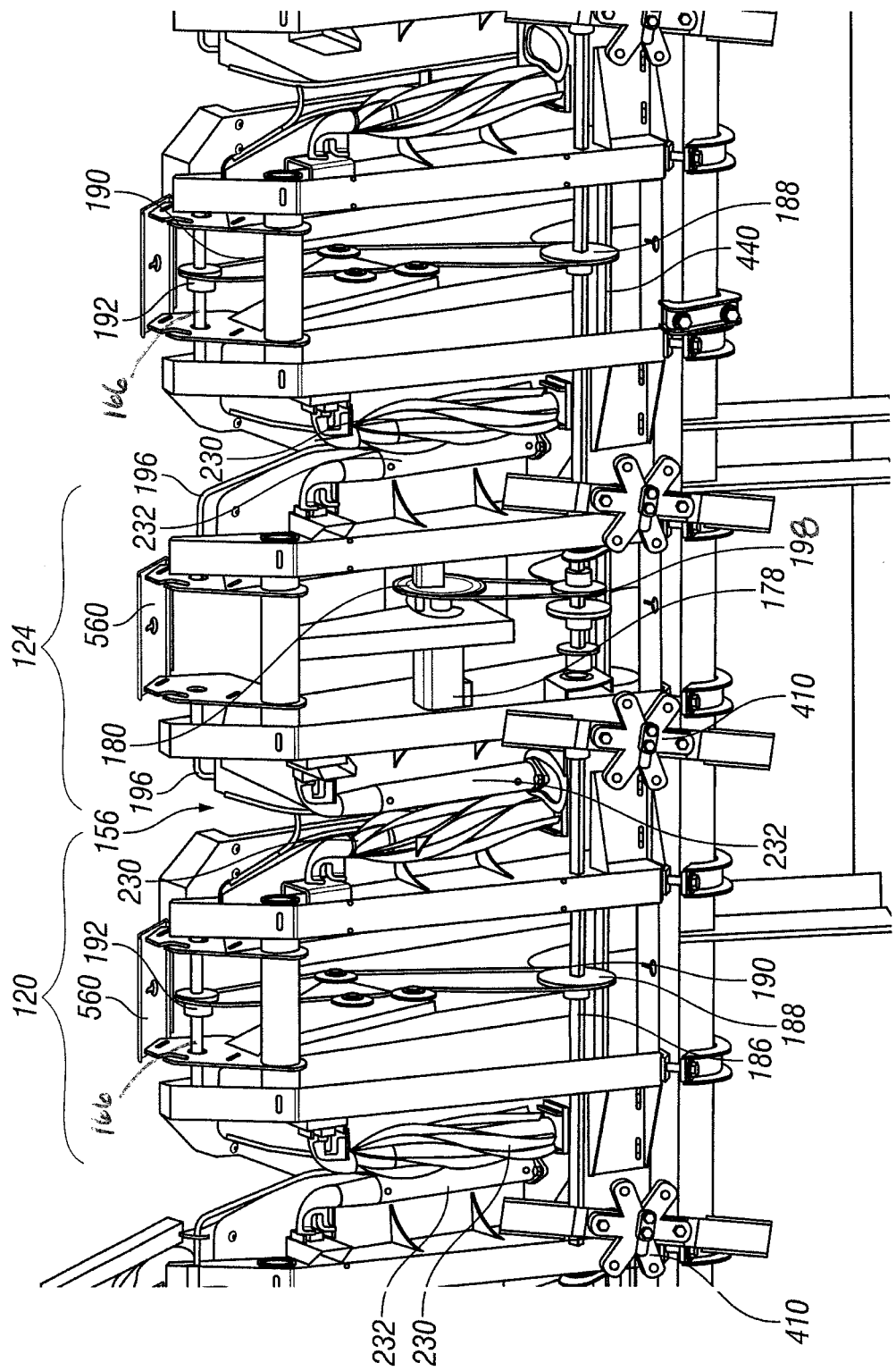
FIG. 4 shows a portion of the bottom of the header of FIG. 1.
Figure 5:
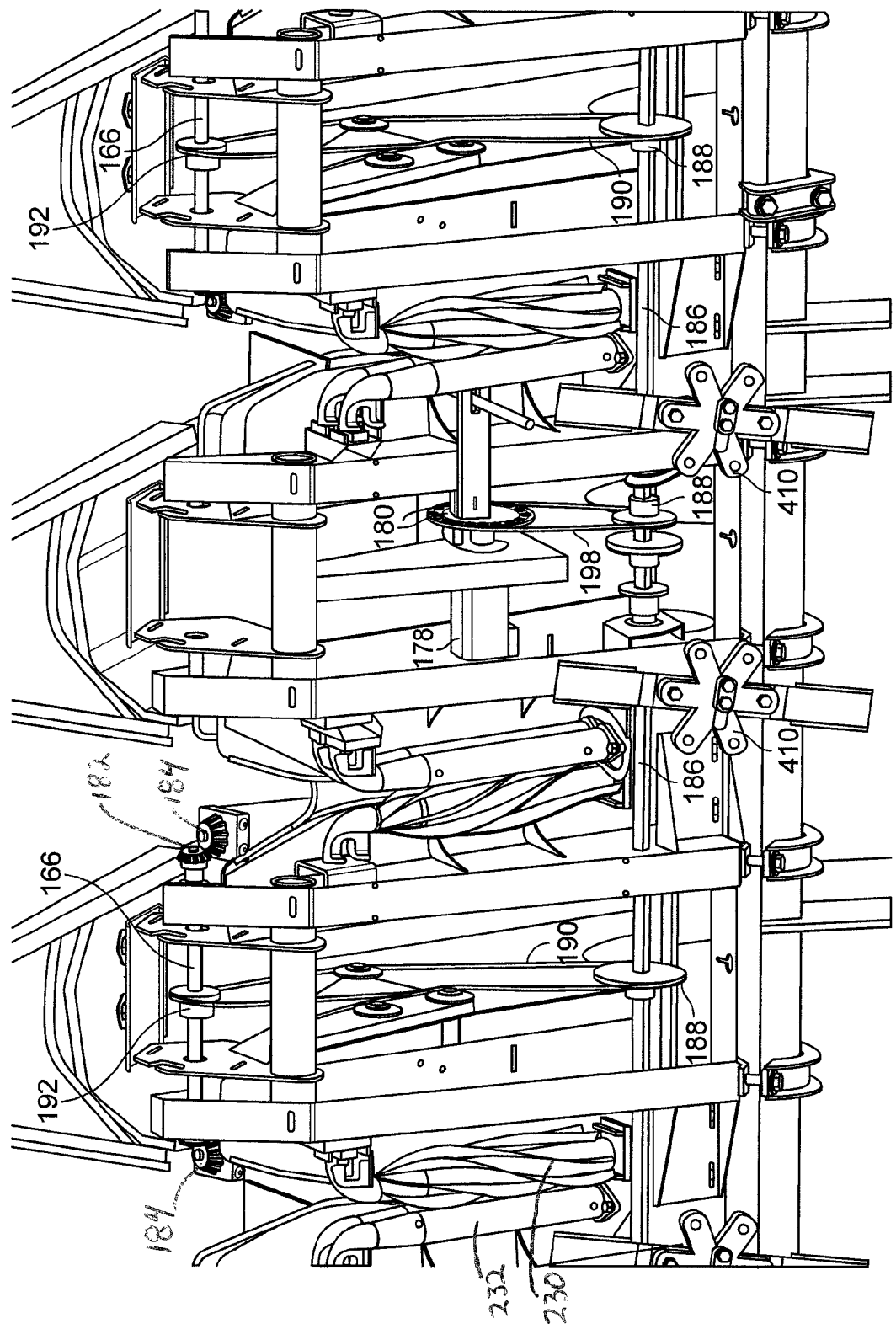
FIG. 5 shows a close-up view of a portion of the bottom of the header of FIG. 1.

Live row units 120 and dead row units 124 cooperate with one another. Live row units 120 have powered components, as described in greater detail below, whereas the dead row units 124 generally do not have powered components. In one embodiment, as best shown in FIGS. 1 and 2, the header 110 has four live row units 120, three dead row units 124, plus one half of a dead row unit 130 on each end of the header 110. The row units 120, 124 are arranged relative to one another so that the row units 120, 124 alternate relative to each other along the length of the header 110. In other words, every other row unit is a live row unit 120 with a dead row unit 124 adjacent to each live row unit 120. The row units 120, 124 are spaced relative to one another to correspond with the spacing of the crop to be harvested and to provide a path to receive the crop therebetween. For example, a live row unit 120 may be placed between two dead row units 124 to cooperate therewith.

Figure 6:
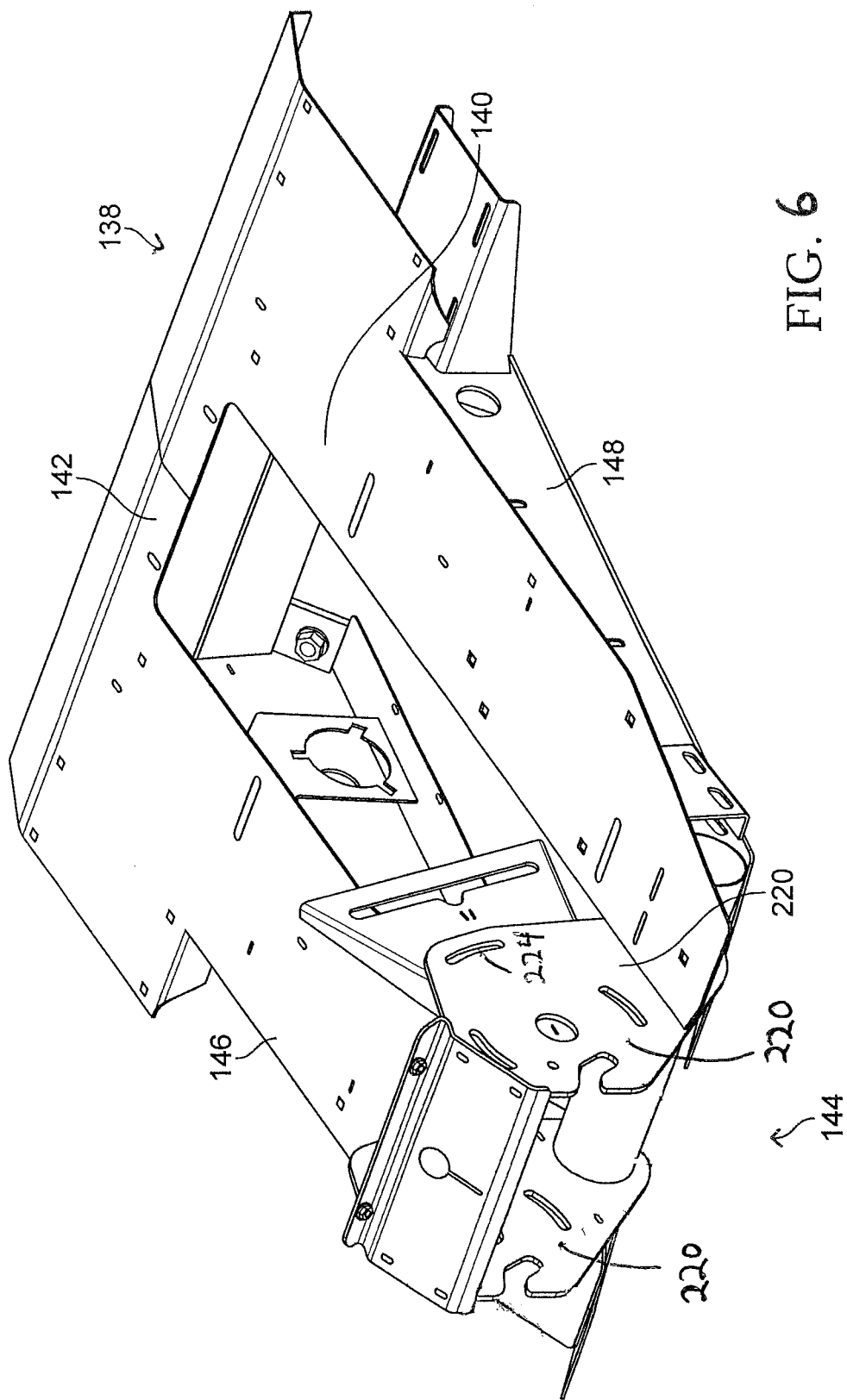
FIG. 6 shows a perspective view of a frame which forms part of a live row unit and part of an adjacent dead row unit.
Figure 7:
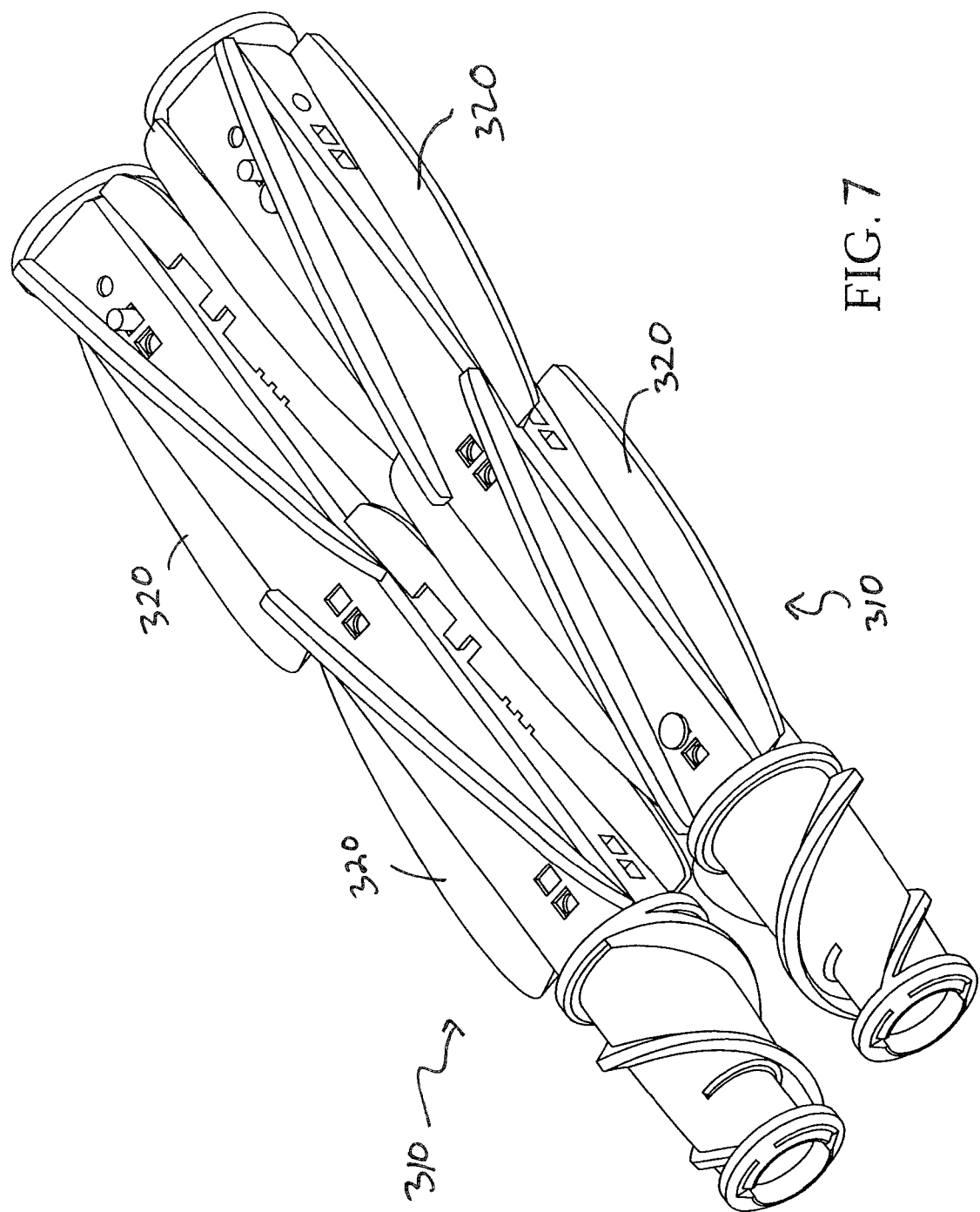
FIG. 7 shows a perspective view of a pair of helical-acting snap rolls opposing one another.
Figure 8:
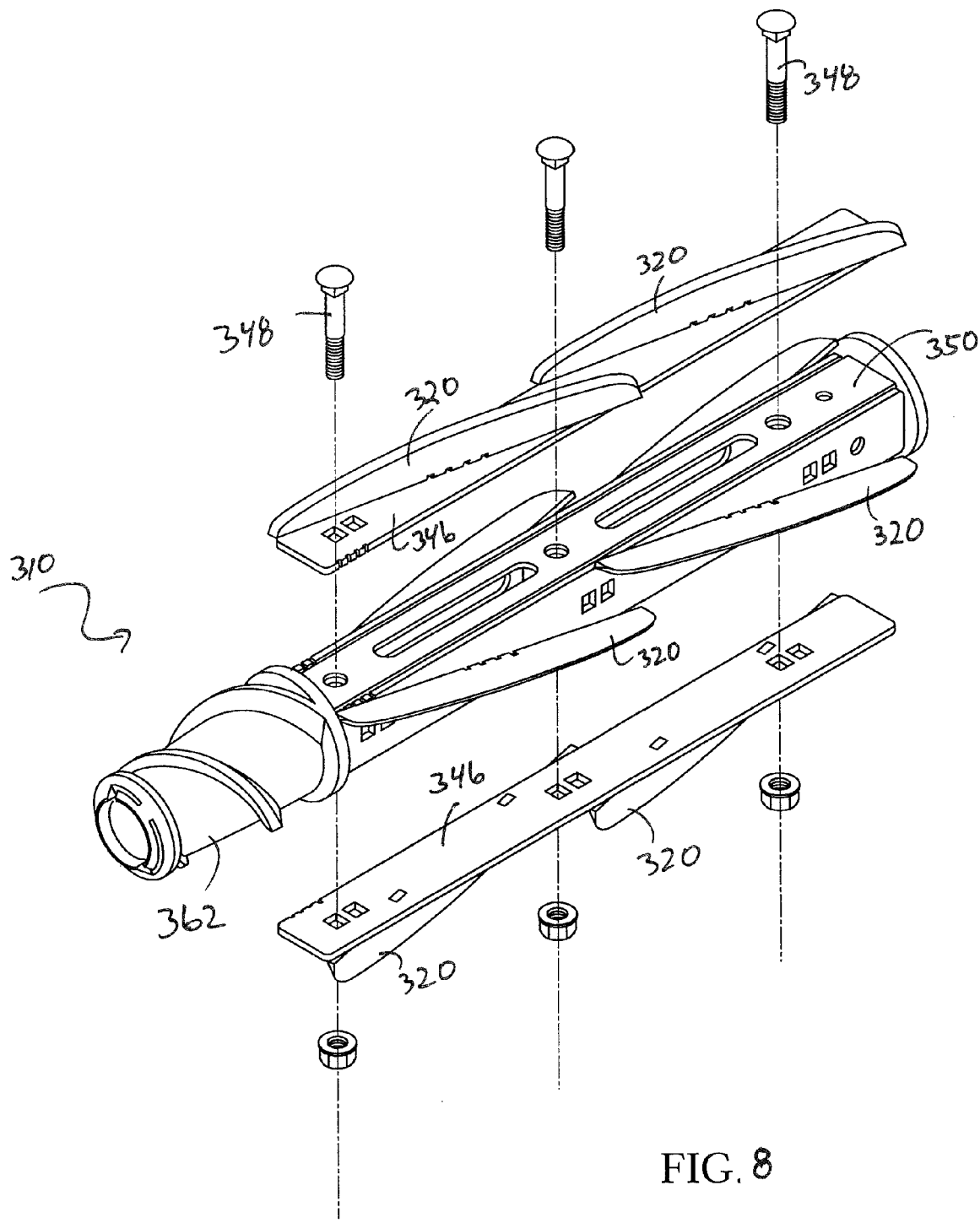
FIG. 8 is an exploded view of a snap roll of FIG. 7.
Figure 9:
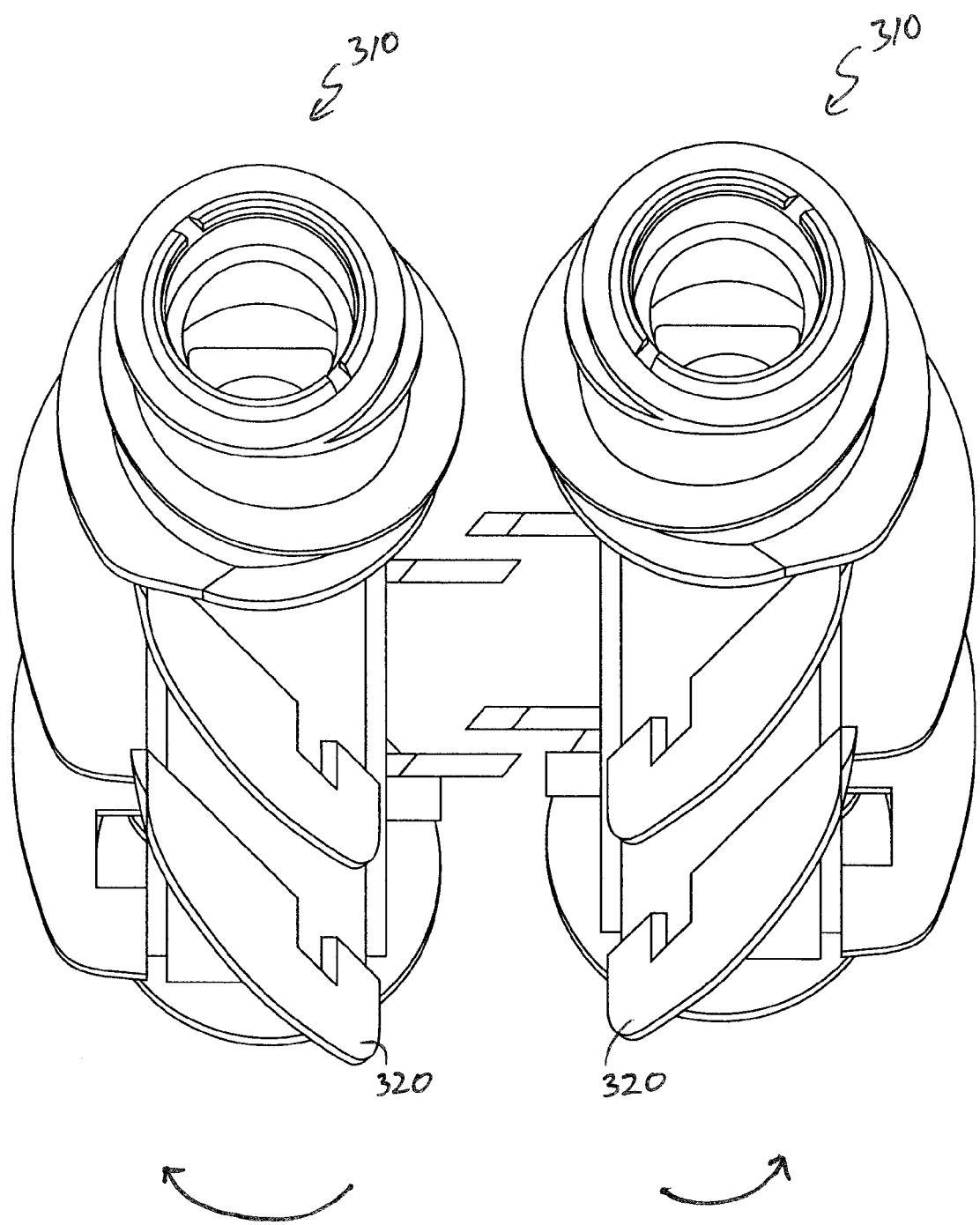
FIG. 9 is a front view of the snap rolls of FIG. 7 where their distal edges run point to point.
Figure 10:
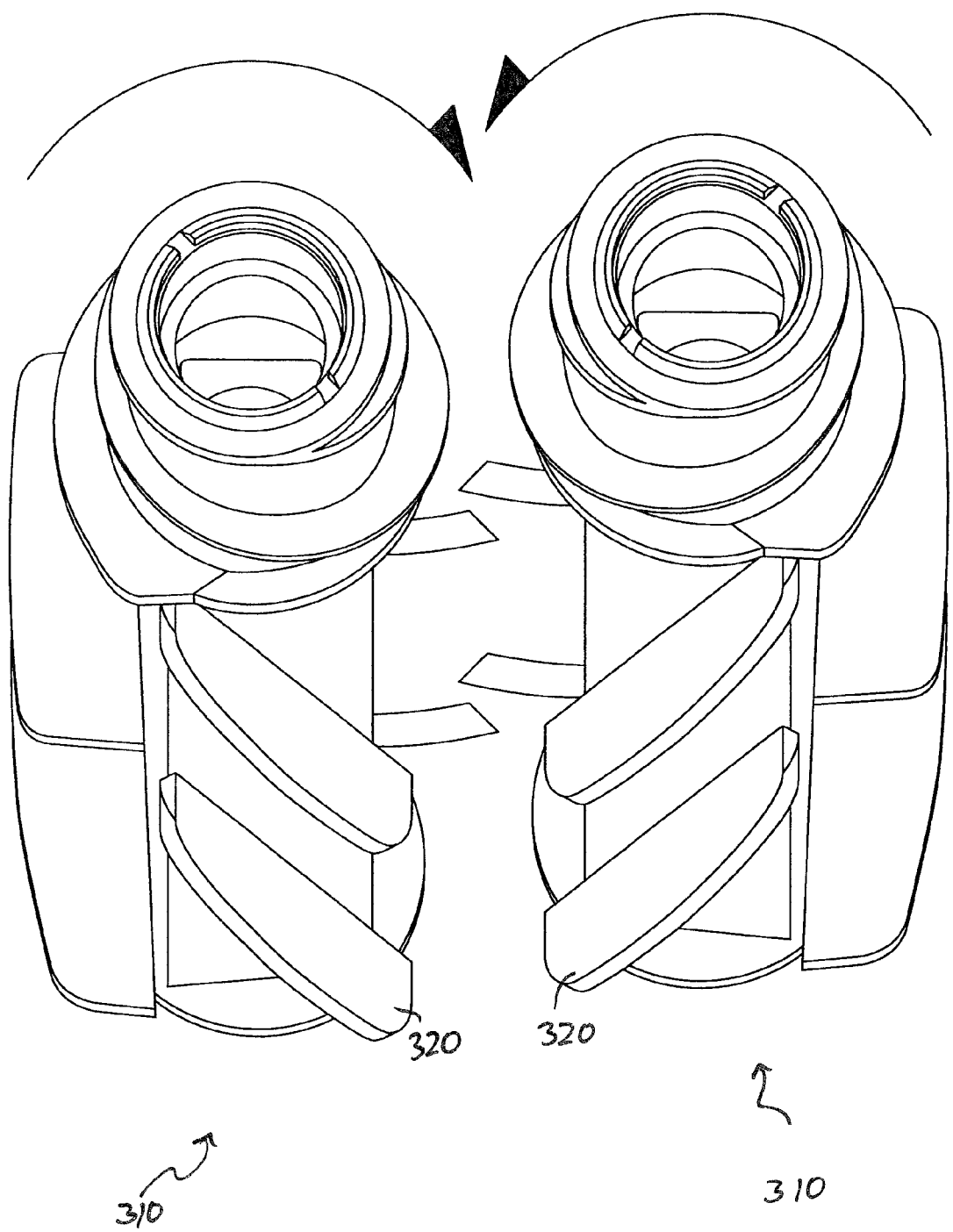
FIG. 10 is a front view of the snap rolls of FIG. 7 where their distal edges run point to heel.

FIG. 6 illustrates a row assembly 138 having a frame 140, a back end 142 and a forward end 144. Half of the frame 140 forms part of a live row unit 120 and the other half forms part of a dead row unit 124. Therefore, one live row unit 120 includes two halves of two separate and adjacent frames 140. One dead row unit 124 includes two halves of two separate and adjacent frames. Each frame 140 includes a first portion 146 and a second portion 148 which are spaced from one another and protrude outwardly and forward from the back end 142. At the front and between adjacent row units 120, 124 is a crop entry 150 for receiving the stalks of the crop. The first and second portions 146, 148 receive stripper plates 154 which cooperate with one another to define the crop passage 156 between adjacent row units 120, 124. The stripper plates 154 strip useable parts such as ears of corn from crop stalks that are received in the crop passage 156.

Each live row unit 120 of the present invention includes at least one fore-to-aft gathering auger 160, in place of the two gathering chains and tensioners, for conveying the useable parts rearward to the cross auger 110. Each gathering auger 160 has a proximal end and a distal end and is preferably aligned substantially with a corresponding crop passage 156. However, the axis of rotation of the gathering auger 160 may instead be misaligned with the crop passage 156 such that the crop stalks in the back of the crop passage may be urged more so toward the gathering auger 160 than the crop stalks are at the beginning of the crop passage 156.

Preferably, each live row unit 120 includes a pair of counter-rotating augers 160. The dead row units 124, on the other hand, do not include gathering augers 160 or any gathering chains. Therefore, the complexity of the header 110 is reduced by utilizing gathering augers 160 on live row units 120 instead of gathering chains and tensioners. Also, by utilizing dead row units 124 in combination with the live row units 120 the overall complexity of the header 110 is substantially reduced because the dead row units 124 do not have gathering augers 160 or gathering chains and tensions and also because the drive means for driving the gathering augers 160 is simpler than known drives used in combination with gathering chains.

The gathering augers 160 are preferably driven independently of the snap rolls. The gathering auger 160 may be driven by electrical, mechanical or hydraulic means. Preferably, each gathering auger 160 is cantilevered from the frames 140 and rotationally driven from the forward most end of its respective row unit 120 away from the cross auger 110 rather than the rear of the row unit 120 in close proximity to the cross auger 110 so that the delivery or the distal end of the gathering auger 160 is not obstructed. This allows ears and stalks to be delivered to the cross auger 110 unimpeded by bearing supports, drive mechanisms or some other crop impeding structure.

In one or more embodiments of the present invention, the proximal end of one or more gathering augers 160 is coupled to the frame 140 of the row unit 120 in a manner that permits the distal end of the gathering auger 160 to move into and out of the feeder plane. In one embodiment, a mechanism coupled to the proximal end of the gathering auger 160 allows the gathering auger 160 to rotate or pivot in a vertical plane between a first position for processing crops when harvesting and a second position for maintenance purposes. Preferably, the distal end of the gathering auger when in the first position is higher in the vertical plane than when the distal end is in the second position.

Also, the gathering auger 160 preferably pivots partially about a substantially horizontal rotational axis that extends substantially transversely between the row units 120. The gathering auger 160 may be pivoted such that its distal end is raised upward above the row unit 120 to allow the gathering auger 160 to be repaired, replaced or perform maintenance without interference from the cross auger 110. Also, when the gathering auger 160 is pivoted upward out of the feeder plane other components can be more easily accessed.

An arrangement of gears or wheels such as bevel gears 182, 184 may be used for transmission of the driving motion to the gathering auger 160 from a driven shaft 166 within each live row unit 120 while also allowing the distal end of the gathering auger 160 to pivot upward about the same axis of the shaft 166. Each shaft 166 preferably drives a pair of gathering augers 160 of a single live row unit 120 so that the pair of gathering augers are driven about the same axis about which they may pivot into and out of the feeder plane. When the gathering auger 160 is pivoted upward, fasteners may be removed from the auger 160 so that the outer flighting portion of the gathering auger 160 may slide rearward so that it may be removed from an inner shaft and from cylindrical bearings allowing the flighting portion to rotate about the inner shaft.

A mounting bracket 210 rotationally couples the gathering auger 160 to an outer side of the frame 140 of the row assembly 138, such as vertical mounting support 220, to secure the gathering auger 160 to the frame 140 in an operational manner. The vertical mounting support 220 includes radial extending openings or arched slots 224 for receiving fasteners 226 for securing the mounting bracket 210 to the frame 140. When the distal end of the gathering auger 160 is pivoted upward, the distal end of the gathering auger 160 coupled to the mounting bracket 210 causes the mounting bracket 210 to rotate in the slots 224 of the vertical mounting support 220. The length of the arched slots 224 dictate the range the gathering auger 160 can be pivoted between the first and second positions. The range of motion of the distal end of the gathering auger 160 may be limited by the length or shape of the slots 224.

The pair of straight bevel gears 182, 184, in mesh are used to drive the gathering auger 160 while harvesting. The shaft 166 of the live row unit 120 corresponds with the axis upon which one or more augers 160 pivot. The distal end of the gathering auger 160 is coupled to the bevel gear 182 which is driven by the bevel gear 184 on shaft 166. The shaft 166 may be chain driven by a hydraulic drive motor 178 with sprocket 180. Preferably, the drive motor 178 is sufficiently sized to drive all of the gathering augers 160. The drive motor 178 and sprocket 180 with chain 198 drives sprocket 188 and shaft 186 which extends in a transverse manner along the length of the header 100. There are preferably numerous other sprockets 188 along the length of the shaft 186. The number of sprockets 188 depends on the number of live row units 120. Chains 190 extend from the sprockets 188 of the shaft 186 to sprockets 192 on shaft 166.

Because the augers 160 are driven by the drive motor 178, the speed of the augers 160 is independent of the speed of the cross auger 110. The chain 190 driving the sprocket 192 which in turn drives the shaft 166 with bevel gears 182. The speed of the augers 160 can be changed automatically or manually in relation to the ground speed much like current grain headers on harvesters that control reel speed. Moreover, the augers 160 can be driven independent of the snap rolls. The speed of the gathering augers 160 may be varied while either or both the harvester and the snap rolls are maintained at a constant speed.

In addition to the apparatuses described herein, the inventions include a method for harvesting crop with an attachment for an agricultural vehicle that includes the gathering augers 160. The method includes operating the gathering augers 160 at a first speed to gather crop stalks in the crop passages 156 and operating a snap roll for removing useable parts from crop stalks at a second speed independently of the gathering augers 160. The method may also include one or more of the following steps: varying the speed of the gathering augers 160 while the speed of the snap rolls remain constant, increasing the speed of the gathering augers 160 while the speed of the snap rolls remain constant, decreasing the speed of the gathering augers 160 while the speed of the snap rolls remain constant, varying the speed of the snap rolls while the speed of the gathering augers 160 remain constant, increasing the speed of the snap rolls while the speed of the gathering augers 160 remain constant, decreasing the speed of the snap rolls while the speed of the gathering augers 160 remain constant, and/or changing the speed of the gathering augers 160 relative the ground speed of the harvester.

To keep stalks captured and engaged by the gathering auger 160 an elongated member 196 such as a rod is positioned in close proximity to the flighting of the gathering auger 160. Preferably, the elongated member 196 is substantially parallel aligned with the gathering auger 160. However, in other embodiments, at least a portion of the elongated member 196 may be shaped or curved along its length or the distal end of the elongated member 196 may be closer in proximity to the distal end of the gathering auger 160. The elongated member 196 may be rigid, flexible, or semi-flexible to urge the stalks in the crop passage toward the gathering auger 160. In one or more embodiments, the elongated member 196 is cantilevered off the forward end 144 of the frame 136 of the dead row unit 124 to urge the stalks in the crop passage 156 toward the gathering auger 160 of the opposing live row unit 120. The dead row unit may also include a second elongated member 196 extending toward another gathering auger 160 of another live row unit. In an alternative embodiment, the elongated member 196 may be a strap or be detachably coupled or mounted to a row unit.

Underneath the stripper plates 154 of each frame 140 are one or more snap rolls. At each crop passage 156 there is one driven snap roll 230 on one side of the crop passage 156 and one or more undriven idler rolls 232 opposing the snap roll 230 from the other side of the crop passage 156. Angled bearing supports may be used to mount the snap rolls and idler rolls to the frames.

Because the idler rolls 232 are undriven, the powered snap roll 230 is operated at different speeds relative to the idler rolls 232. Preferably, the powered snap roll 230 opposes a pair of idler rolls 232. On each side of a live row unit 120 there is a driven snap roll 230 and on each side of a dead row unit 124 there is at least one idler roll 232. Preferably, each side of the dead row unit 124 includes two idler rolls 232 for a total of four idler rolls 232 for each dead row unit 124. Unpowered idler rolls 232 preferably have smooth outer peripheries without knives or bars and are lighter and less expensive which helps to conserve power that could instead be used to chop stalks with mowers as described below.

Preferably, the powered snap rolls 230 include knives 234. If the idler roll 232 where to be powered it could be powered at a slower speed than an opposing snap roll 230. Also, the idler roll 232 could be adjustable relative to the side of the frame 136 of a dead row unit 124 so that it could be moved closer to the snap roll 230 for stalk chopping or moved away when reduced stalk chopping is desired.

One or both ends of the idler roll 232 could also be spring loaded to allow it to move away if an obstruction is encountered in the crop passage 156. The angle bearing could incorporate a spring or a spring could be used at the opposite end to bias the idler roll toward the crop stalks and the opposing snap roll but then also allow an obstruction to pass between the opposing idler and snap rolls by compressing the springs.

The inventions also include a method for harvesting stalk crops with an attachment for an agricultural vehicle. The method includes pulling crop stalks in a crop passage with a snap roll against at least one stripper plate. The method also includes biasing the snap roll toward the crop stalks in the crop passage and allowing the snap roll to move laterally in the event of an obstruction in the crop passage impacting the snap roll. The movement of the snap roll allows the obstruction to pass.

A single idler roll 232 is preferably offset from its opposing snap roll 230 in that the snap roll 230 and idler roll 232 are at different heights or different distances from the ground so that the corn plant is not pulled straight down or in other words is pulled down at other than a perpendicular angle to the ground. If utilizing a pair of idler rolls 232 to oppose the snap roll 230, upper and lower idler rolls 232 are positioned so that the axis of rotation of the driven roll 230 is vertically between but horizontally offset from the axis of rotation of each idler roll 232. The axes of rotation of both idler rolls 232 are preferably both parallel and vertically aligned with each other because the idler rolls 232 are at different distances from the ground relative to each other.

One or more idler rolls 232 vertically offset from their opposing and corresponding snap roll 230 helps to lean or urge the corn plant toward the gathering auger 160 which is positioned on one side of a live row unit 120. Also, in one or more embodiments, the stripper or deck plates 154 may also be offset from one another relative to the ground to urge the crop to the side of the crop passage 156 with the gathering auger 160. Improved cutting action is achieved by running the knives 234, also commonly referred to as flutes or bars, of the powered snap rolls 230 in close proximity to the one or more opposing idler rolls 232. A pair of idler rolls 232 cooperating with one another to oppose a snap roll 230 further increase the cutting and chopping ability by enhancing the engagement of the stalks in the knives 234 of the snap roll 230.

Figure 11A:
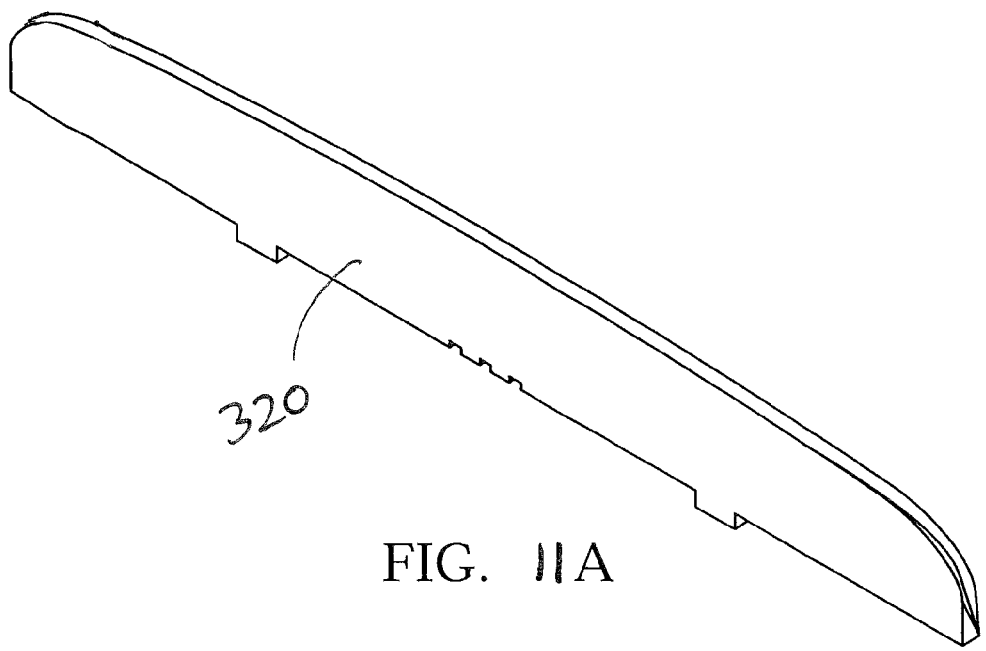
FIGS. 11A, 11B and 11C illustrate the elliptical shape of the distal edges of the snap rolls of FIG. 7.
Figure 11B:
Figure 11C:
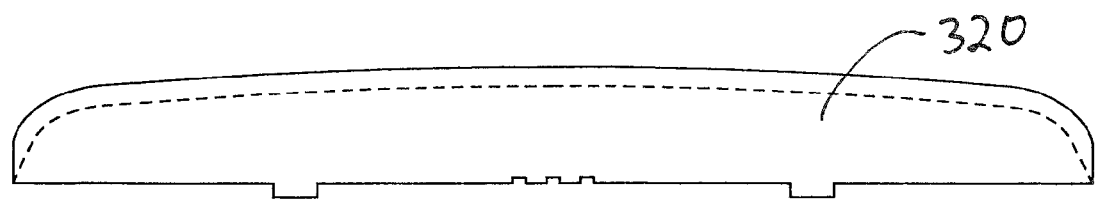

The header 100 may be equipped with one or more straight helical-acting snap rolls 310 shown in FIGS. 7-10. The snap roll 310 includes a plurality of straight knife or straight bar portions 320 arranged to extend outward from the roll 310 and relative to one another to achieve the same results that a formed helical knife would. Because the portions 320 are straight relative all or at least most of their lengths they are free of a formed twist and therefore easier to manufacture compared to a twisted helical knife. Some of the straight portions 320 are closer in proximity to the leading end of the snap roll 310 while others are closer to the trailing end. But leading ends of the trailing straight portions 320 extend forward of or overlap trailing ends of the leading straight portions 320 creating a continuous cutting action. Therefore, the length of a leading straight portion 320 is partially parallel misaligned with the length of a corresponding trailing straight portion 320 on their respective side of the snap roll 310. Each of the straight portions 320 does not extend beyond its own flat member 346 or outer surface 350. The straight portions 320 of a pair of opposing and counter-rotating snap rolls 320 cooperate with one another to chop crop stalks and create a helical action to convey crop stalks rearward. Preferably, each portion 320 includes a distal cutting or knife edge that is elliptical rather than having an edge of constant radius as best shown in FIGS. 11A, 11B and 11C.

The straight knife/bar portions 320 are mounted to flat members 346 which are in turn preferably mounted with fasteners 348 to outer sides or surfaces 350 of the body of the snap roll 310. Other than cones 362, the outer surfaces 350 of the snap roll 310 are preferably flat or at least other than round for easy of manufacture. The straight portions 320 are mounted at an angle rather than parallel aligned to the rotational axis of the snap roll 310. In other words, the straight portions 320 are misaligned with the central axis of rotation of the snap roll 310.

Knife portions 320 on one snap roll 310 should run in close proximity to the knife portions 320 on a counter-rotating and opposing snap roll 310 to achieve a scissors like action that continuously chops and cuts stalks. The knife portions 320 are preferably mounted so that the distal edges of the opposing knife portions are run point to point but may instead be run point to heel. Because the opposing snap rolls 310 are rotating in opposite directions the opposing knife portions 320 run in the same direction downward between the opposing snap rolls 320. When the knives of opposing snap rolls 310 are point to heel the knives are considered to be going in the same direction down between the opposing snap rolls 310. When the knives of opposing rolls 310 are point to point the knives are considered to run to each other because the points of opposing knife portions face one another.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. In an attachment for a harvester, a forward-extending first row unit comprising at least one stripper plate at least partially defining a crop passage, said first stripper plate configured to remove useable parts from crop stalks gathered in said crop passage, said first row unit further comprising a first snap roll to pull the crop stalks in said crop passage against said stripper plate, said first snap roll comprising a plurality of straight portions wherein said straight portions are substantially straight relative at least most of their length, said straight portions misaligned with a central axis of rotation of said first snap roll, a length of one of said straight portions partially parallel misaligned with a length of another of said straight portions, wherein the rotation of said first snap roll with said plurality of straight portions creates a helical action, wherein said one straight portion is closer in proximity to a leading end of said first snap roll than said other straight portion but a leading end of said other straight portion extends forward of a trailing end of said one straight portion.

2. The first row unit of claim 1 wherein said first snap roll is otherwise free of a formed twist.

3. The first row unit of claim 1 wherein said first snap roll comprises a plurality of sides defining an outer surface, said one and said other straight portions extending from one of said sides.

4. The first row unit of claim 3 wherein each of said plurality of sides is flat.

5. The first row unit of claim 3 wherein each said side has at least two straight portions.

6. The first row unit of claim 3 wherein each said straight portion only extends across one of said sides.

7. The first row unit of claim 1 wherein each said straight portion includes a distal edge that is partially elliptical in shape.

8. The first row unit of claim 1 wherein each said straight portion includes a distal edge that is not a constant radius.

9. The first row unit of claim 1 further comprising a second snap roll having an outer surface and a second plurality of straight portions, said first and second snap rolls opposing one another such that said straight portions of said first snap roll cooperate with said straight portions of said second snap roll to chop crop stalks passing between said first and second snap rolls.

10. The first and second snap rolls of claim 9 wherein each of said first and second plurality of straight portions extend from said outer surfaces such that a point of a distal edge of each of said first plurality of straight portions opposes a point of an edge of a corresponding one of said second plurality of straight portions.

* * * * *